(No Model.) 2 Sheets—Sheet 1.
C. A. FAURE.
APPARATUS FOR MEASURING AND REGISTERING ELECTRIC CURRENTS.
No. 443,636. Patented Dec. 30, 1890.
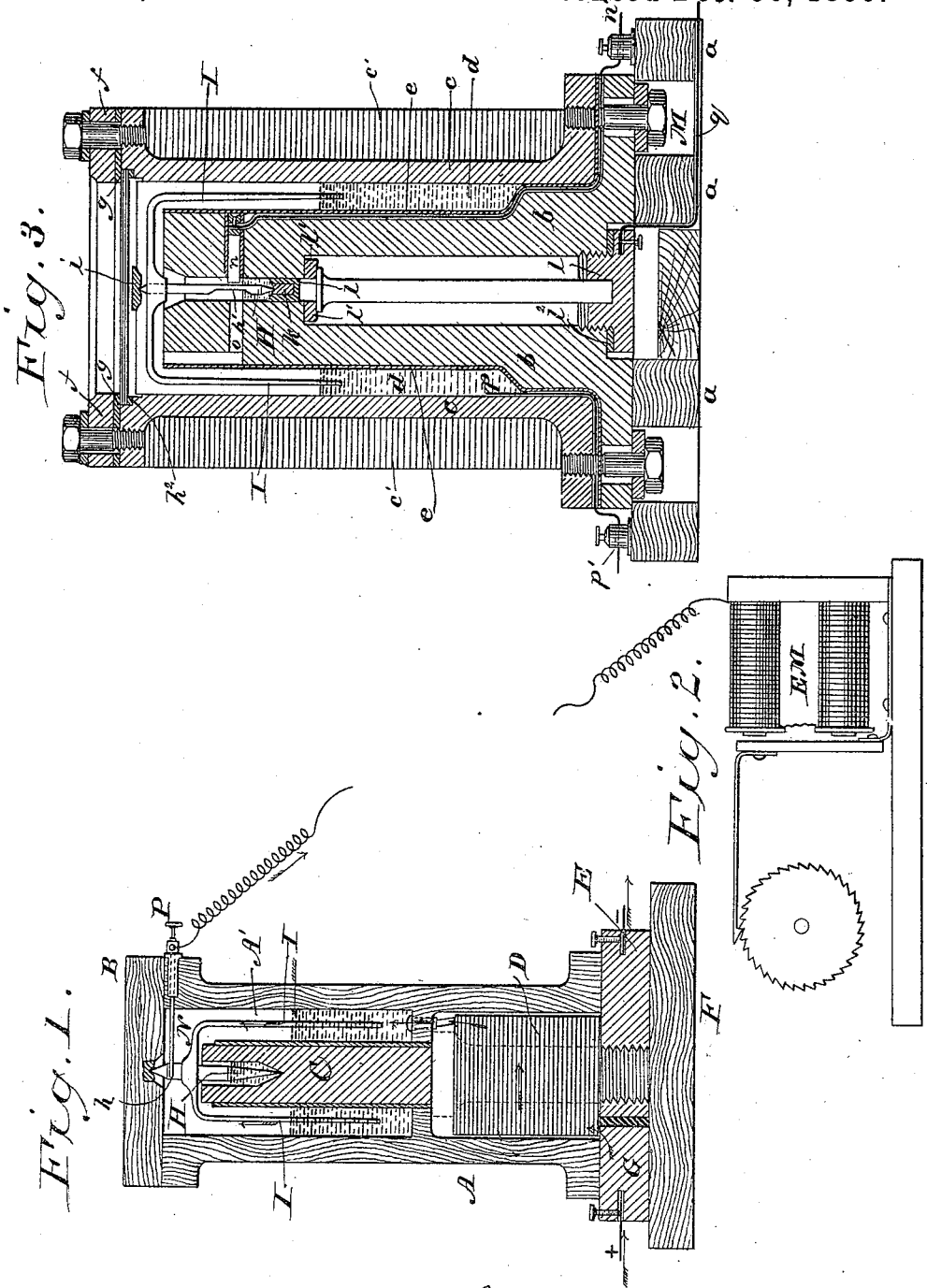
WITNESSES
H. C. Newman
E. S. Newman
INVENTOR
Camille Alphonse Faure
By his Attorneys
Baldwin, Davidson & Wight (No Model.) 2 Sheets—Sheet 2.
C. A. FAURE.
APPARATUS FOR MEASURING AND REGISTERING ELECTRIC CURRENTS.
No. 443,636. Patented Dec. 30, 1890.
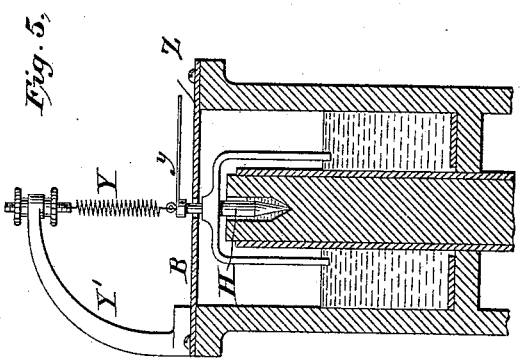
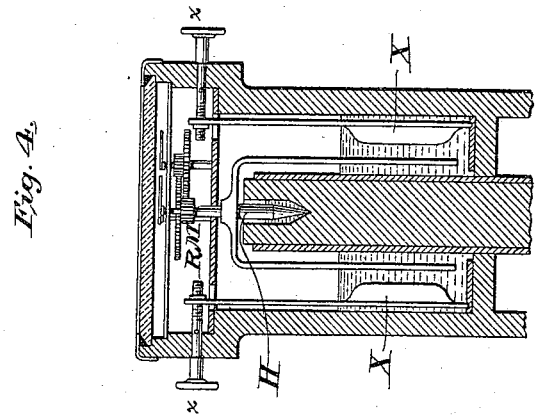
Witnesses
W. Arthur Barr.
Balters DeLong.
Inventor
Camille Alphonse Faure
By his Attorney
Baldwin, Davidson & Wight

UNITED STATES PATENT OFFICE.

CAMILLE ALPHONSE FAURE, OF NEW YORK, N. Y., ASSIGNOR TO EDWARD C. DAVIDSON, OF SAME PLACE.

APPARATUS FOR MEASURING AND REGISTERING ELECTRIC CURRENTS.

SPECIFICATION forming part of Letters Patent No. 443,636, dated December 30, 1890.

Application filed November 1, 1888. Serial No. 289,757. (No model.) Patented in England February 15, 1882, No. 730; in France February 27, 1882, No. 147,578, and in Belgium February 28, 1882, No. 57,190.

*To all whom it may concern:*

Be it known that I, CAMILLE ALPHONSE FAURE, a citizen of the Republic of France, residing in New York city, in the State of New York, have invented certain new and useful Improvements in Apparatus for Measuring and Registering Electric Currents, of which the following is a specification.

The invention has been patented by me in England, No. 730, dated February 15, 1882; in France, No. 147,578, dated February 27, 1882, and in Belgium, No. 57,190, dated February 28, 1882.

My invention relates more especially to what are known as "motor-meters," in which the quantity of current is measured by the rotation or movement of part of the apparatus.

One of the principal objects of the invention is an instrument for permanently registering the amount of electricity that is passing in a conductor, so as to permit of the easy reading of the quantity of current at different periods of time, as a gas-meter is read. In such an instrument it is desirable that the speed of working should be directly proportional to the quantity of current passing and that the record should be permanent and accurate.

The invention is generally based upon the well-known principle that a conductor conveying a current tends to rotate in a magnetic field; but, so far as I am aware, I am the first to employ a rotary non-commutator electric motor to actuate the registering mechanism of a meter.

I have shown the conductor in the form of arms projecting from a rotating spindle and arranged in a magnetic field in such manner that the arms or conductors through which the current to be measured is passed rotate across the lines of force and at substantially right angles thereto, the current passing radially from the outer ends of the conductors to the rotating spindle. The bearing of the spindle runs in mercury, a good contact being thus obtained, and the radial arms dip into mercury contained in an annular chamber, thus affording a convenient means of conveying the current through them, and at the same time the mercury resists the rotation of the conductors, reducing the speed to the proper extent and making it proportional to the current passing through the instrument.

The invention may be embodied in convenient forms of apparatus, examples of which are shown in the drawings, in which—

Figure 1 is a vertical section; Fig. 2, a detail view of electro-magnetic means for actuating registering devices. Fig. 3 is a vertical section of a somewhat different form of apparatus; Fig. 4, a view showing registering mechanism driven directly by the moving part of the meter, and also means for regulating the retarding influence of the mercury upon the conductor; and Fig. 5, a sectional view showing another form of apparatus in which the strength of the current is indicated on a scale by a pointer.

Referring to Fig. 1, A represents a casing, of wood, ebonite, or other suitable non-conducting material. Within the casing is arranged a soft-iron core C, the base of which is surrounded by a coil or bobbin D of copper wire, through which the current to be measured passes. Above the coil the interior of the casing is divided by an annular internal projection or flange, through which the core C extends upwardly.

The upper part of the core C within the chamber A' is covered with insulating and impermeable material, as shown, and its top is hollowed out to receive an axis or pivot H, carrying two radially-projecting conductors I, of platinum or iron wire. These conductor or radial arms are turned down parallel with the core C and dip into a body of mercury surrounding the core and insulated from it by the covering of insulating material. Mercury may also be placed in the hollow in the top of the core to insure a good electrical contact, and the quantity of mercury in the vessel is such that when the instrument is laid upon its side the mercury enters the hollow and by this means it is always kept properly charged.

An air-tight cover B closes the top of the casing A and protects the surface of the mercury from the atmosphere. The cover may carry the upper bearing of the spindle H. The spindle is arranged concentrically with the axis of the magnet.

Both the casing A and the core C are fixed upon an iron plate E, mounted upon a wooden base F. Another piece of iron G completes the base of the casing, but is insulated from the piece E. The course of the current to be measured is indicated by the arrows. It may enter at the iron piece G, pass thence through the coil of the core C, then to the mercury and rotating conductors I, through the core C, and out by the base-plate E. The passage of the current through the conductors I within the magnetic field causes their rotation, and the spindle H, with which they are connected, actuates the registering mechanism.

In the instrument shown in Fig. 1 the current to be measured is caused to circulate in the coils of the magnet and in the moving conductors, and the moving force is proportional to the square of the current. The resisting medium is the mercury in the cup, which for this purpose is made sufficiently deep. Now, as the force required to move any object through a liquid is proportional to the square of the speed, it follows that the number of rotations of the conductor will be proportional to the current to be measured. The mercury-cup is shown as enveloping the whole of the top part of the magnet and is hermetically sealed, so that the mercury may not escape during the carriage of the instrument.

Increased resistance to the motion of the rotating conductor may be applied by alloying the mercury, or, more properly, by resisting-vanes, which may be operated from the outside of the envelope of the mercury. In this manner the instruments may be made use of with very varying strengths of currents. Each meter has, of course, by reason of friction and other causes, a certain mechanical resistance which the current must overcome, and the vanes in any given position give the meter a definite resistance to being driven. By adjusting the vanes, therefore, or in other words, varying their relation to the mercury, the mechanical resistance of the meter may be varied to suit the current passing through the instrument. A suitable construction for this purpose is shown in Fig. 4, in which resisting-vanes X are arranged in the mercury and operated from the outside by thumb-screws $x$, projecting through the casing and gearing with small pinions on the upper ends of the spindles of the vanes. By turning them more or less across the path in which the mercury tends to rotate the mercury is caused to exert a greater or less resistance to the rotation of the conductors whose ends are immersed therein. By such means the instrument may be adjusted with facility to the requirements of any circuit.

In Figs. 1 and 2 the following means of registering the rotation of the spindle are illustrated. Upon the spindle H there is a platinum contact-piece $h$, which at each revolution touches a light spring N, connected with the binding-screw P. One end of the coil of the electro-magnet EM is connected with the screw P, and the other end with the main circuit—for instance, with the iron piece G. The spindle H at each rotation closes the circuit of the magnet EM, causing it to attract its armature and thereby actuate a toothed registering-wheel. The current for operating the registering mechanism may be supplied by separate battery. As I have indicated in Fig. 4, the registering mechanism may be operated directly by the spindle H, and intervening electro-magnetic devices be dispensed with. RM indicate registering mechanism arranged in the upper part of the casing, which now has a glass cover through which the dials may be read.

Instead of creating the magnetic field by the current to be measured, I may use a permanent magnet or a coil, or electro-magnet circulated by a foreign but constant current of known magnitude. These means may be resorted to when the current to be measured or registered is very weak and it is advisable to have a strong magnetism as a base for the moving force. In such cases, however, the square roots of the dial-readings are to be taken as the true readings.

Such an instrument in which an electro-magnet is employed is shown in Fig. 3. $a$ is an insulating-base, of wood or other material, and $b$ is a central column, preferably of soft iron. $c$ is a hollow iron cylinder, upon which a coil or bobbin $c'$ of insulated wire is wound, thus forming an electro-magnet. The soft-iron column $b$ is arranged within the iron cylinder $c$, and a short distance above the bottom of the cylinder the iron $b$ is reduced, so as to form an annular chamber. The parts $c$ and $b$ are insulated from each other by non-conducting material $e$ enveloping the column $b$. Mercury $d$ is placed in the annular chamber or space between $b$ and $c$. A glass plate or cover is secured in place by a clamping-ring $f$ and an interposed caoutchouc washer $g$, and another washer $h^2$ beneath the glass insures a tight joint. The column $b$ is hollow, and within its upper portion is arranged a rotatable spindle H. The spindle is stepped at its upper end in a cross-piece $i$, and its lower end is stepped in a bearing $k$ within the column $b$. The lower bearing $k$ can be raised and lowered a little by the screw-plug $l$ in the base of the column, the washers $l'$ and $l^2$ being of india-rubber or suitable elastic material. The radial conducting-arms I project from the spindle, as before described, and extend down into the mercury. The quantity of mercury in the apparatus is such that when the instrument is laid upon its side the mercury enters the cavity in the column $b$, within which the spindle is mounted, and when the instrument is set upon its base the excess of mercury in said cavity overflows into the annular chamber through an opening $o$. The mercury will, therefore, always stand at a uniform height in the cavity. An insulated plug or piece of metal $n$ projects laterally through the column $b$ into the spindle-cavity on a line with the overflow-aperture $o$ and with its end in close proximity to the spindle. The spindle is cut away at $h'$, and the conductor $n$ is in such close proximity to the spindle that in the revolution of the spindle the mercury is drawn up between it and the conductor $n$ by capillary attraction, and therefore as the spindle revolves contact between the mercury and the conductor $n$ is established once in each revolution. The conductor $n$ is connected, as shown, with the binding-screw M, and may be included in a derived or other circuit by means of the wire $n'$, substantially as described in connection with Figs. 1 and 2, the registering mechanism being operated once in each revolution of the spindle. The current to be measured enters the mercury at $p$ from the binding-screw $p'$, and from thence passes by the conductors I to the pivot H, and thence out through the screw-plug $l$ by conductor $q$, as illustrated. Of course the spindle may operate the registering mechanism directly, as indicated in Fig. 4.

Instead of using progressive registering mechanism making a permanent record of the quantity of current, I may apply the invention to instruments for indicating temporarily the strength of the current. In that case the rotating conductor, or rather the spindle, is connected with a spiral or other spring which resists its rotation, and the amount of deviation of the conductor from a given mark gives directly the value of the deflecting-current. Such an instrument is shown in Fig. 5. The spindle H passes through the cover B and is connected with a spiral spring Y, supported from any suitable upright or bracket Y'. The spring opposes the rotation of the spindle, and a pointer $y$ on the spindle indicates the amount of deflection or, in other words, the strength of the current on a scale Z. These motors or motor-meters have, it will be noted, no commutators. If used with an alternating, intermittent, or pulsatory current, they are, of course, non-synchronous in their rotation, and, as hereinbefore stated, under proper conditions the speed of rotation is proportional to the current. As there is no interruption of the current at the motor, there is practically no liability of derangement and no danger of variations in its indications on account of impaired or changing contacts resulting either from wear, sparking, or oxidation, and, further, with such a motor the definite load given it remains constant. All these conditions, aside from other considerations, afford a novel apparatus peculiarly well adapted for use as a meter.

I claim as my invention—

1. In an apparatus for measuring or registering electric currents, the combination, with means for creating a magnetic field, of a rotatable or movable conductor arranged to move substantially at right angles to the lines of force in said field, unchanging electrical connections for passing a current in a uniform manner through the conductor, and current-measuring devices actuated by the conductor, whereby the current passing in said conductor may be determined.

2. The combination, substantially as set forth, with the means for creating a magnetic field, of a rotatable or movable conductor arranged concentrically with the axis of the field and extending radially from said axis, electrical connections for passing a current radially through the conductor, and current-measuring devices actuated by the movement of said conductor, for the purpose set forth.

3. The combination, substantially as set forth, with means for creating a magnetic field, of a rotatable conductor turning upon an axis concentric with the axis of said field, a chamber containing mercury with which the conductor is always in contact, electrical connections for passing a current of electricity through said mercury and conductor, and current-registering devices actuated by the rotating conductor for recording the quantity of the measured current.

4. The combination, substantially as set forth, with means for creating a magnetic field, of a rotatable conductor arranged in said field, a body of mercury in which the conductor runs and which retards the revolution of said conductor, for the purpose described, electrical connections for passing a current of electricity through the mercury and conductor, and thereby causing the rotation of the conductor, and current-registering mechanism actuated by the rotating conductor for recording the quantity of the measured current.

5. The combination, substantially as set forth, with means for creating a magnetic field, of a rotatable conductor arranged in said field and mounted upon a spindle running in mercury, a body of mercury with which said conductor is always in contact, electrical connections for passing a current of electricity through said body of mercury, conductor, and spindle, and current-registering mechanism actuated by the conductor-spindle.

6. In an electric meter, the combination, substantially as set forth, with means for creating a magnetic field independent of the current actuating the measuring or registering devices, of a rotatable conductor arranged in said field, electrical connections by which the current to be measured is passed through said conductor, and registering mechanism actuated by the rotating conductors.

7. In an electric meter, the combination, substantially as set forth, of indicating or registering apparatus, the motor part of the meter through which the current to be measured passes for actuating said apparatus, and means for creating a magnetic field for the meter independently of the current measured.

8. The combination of the indicating or registering apparatus, the rotating part of the meter which actuates said apparatus, and an independent coil through which a current circulates, substantially as described.

9. An electric meter having, in combination, a rotary non-commutator motor and registering or indicating apparatus actuated thereby, substantially as set forth.

10. An electric meter consisting of the combination of a rotary non-synchronous non-commutator motor and registering mechanism driven thereby.

In testimony whereof I have hereunto subscribed my name.

CAMILLE ALPHONSE FAURE.

Witnesses:
AUGUSTUS MERRITT,
EDWARD C. DAVIDSON.